July 14, 1959

S. T. MARKS 2,894,317

METHOD FOR CONSTRUCTING A BARIUM TITANATE
BLAST VELOCITY GAUGE

Filed June 7, 1954

INVENTOR.
Spence T. Marks
BY
W. E. Thibodeau, A. W. Dew
and D. P. Smith ATTORNEYS

United States Patent Office 2,894,317
Patented July 14, 1959

2,894,317

METHOD FOR CONSTRUCTING A BARIUM TITANATE BLAST VELOCITY GAUGE

Spence T. Marks, Aberdeen, Md., assignor to the United States of America as represented by the Secretary of the Army Application June 7, 1954, Serial No. 435,099

2 Claims. (Cl. 29—155.5)

(Granted under Title 35, U.S. Code (1952), sec. 266)

This invention may be manufactured and used by or for the Government for governmental purposes without the payment to me of any royalty thereon.

The invention relates to a velocity gauge and more particularly to an improved construction therefor which is adaptable for the purpose of recording the arrival times of air shocks at a series of stations.

In the course of explosion studies it was found necessary to provide a blast velocity gauge that was, at once, rugged to withstand the violent application of forces, and sensitive to accurately respond to the magnitude and characteristics of such forces. The gauge described in the following specification adroitly solved the problem.

It is accordingly a broad object of my invention to improve on the gauges now in use.

It is a further and more specific object of my invention to provide a gauge utilizing a bonded stack of barium titanate crystals as the sensitive element, which can be polarized after it is placed in a gauge housing and repolarized while in the gauge housing to maintain the gauge at the desired sensitivity.

It is a still further object of my invention to provide a method of assembling a blast velocity gauge having a stack of barium titanate crystals wherein the crystal interfaces are connected in parallel by a plurality of silver foil leads.

It is a yet still further object of my invention to provide a novel method of bonding together a plurality of pressure sensitive crystals to thereby form a stack for use in a velocity gauge.

Other objects and advantages will appear in the following specification in which.

Figure 1:
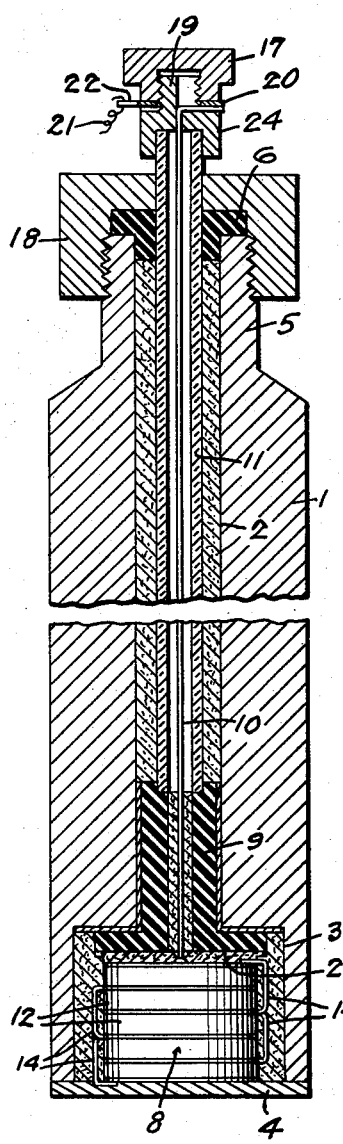
Figure 1 is a longitudinal elevation in section showing the novel pressure gauge.
Figure 3:
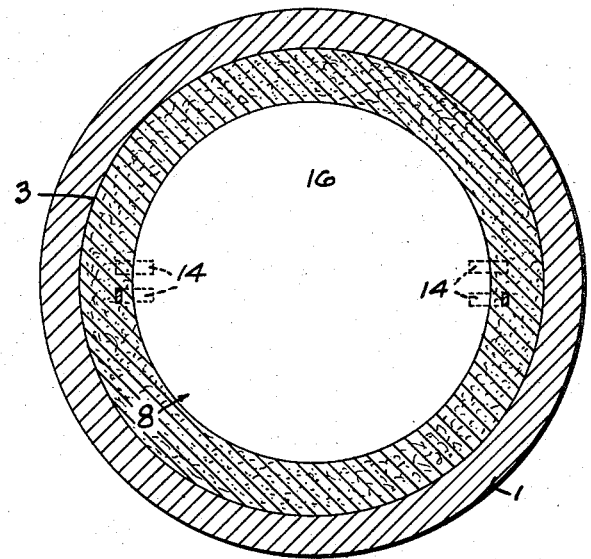
Figure 3 is a view taken on lines 3—3 of Figure 2 and looking in the direction of the arrows.

Referring now to Figure 1 wherein similar reference characters designate similar parts, 1 indicates a cylindrical housing formed with a longitudinal bore 2 at the axis thereof and a cavity 3 of larger diameter formed at one end thereof to receive a pressure sensitive element shown generally as 8, as will be later more fully explained. Threads are cut into a reduced neck portion 5 adapted to receive threaded cap 18 to effectively seal off the inner structure.

The pressure sensitive element 8 is composed of a plurality of barium titanate crystals and is held in its cavity between insulating thimble 9 and brass diaphragm 4 which closes the mouth of the cavity.

Figure 2:
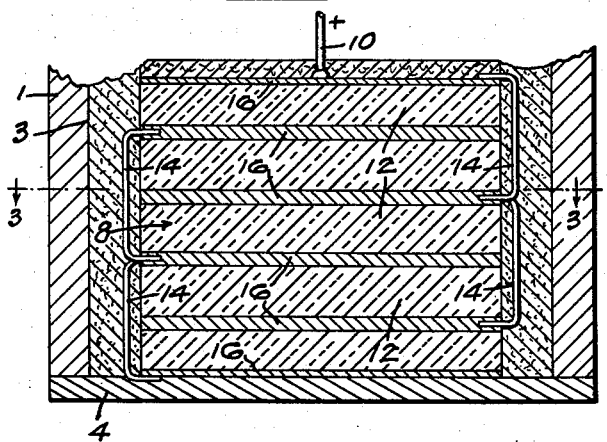
Figure 2 is an enlarged fragmentary view showing the details of the crystal stack.

An enlarged view of the crystal stack appears in Figure 2, wherein reference character 12 indicates the several crystals arranged in contiguous relationship with their longer dimensions parallel. Silver foil leads 14 are depended upon to interconnect the crystal faces, and reference character 16 indicates a silver paste layer applied during assembly of the stack as will later be more fully explained. The five crystal stack shown has been found to have a sensitivity of $500\mu\mu$ coul/p.s.i. and the individual crystals are formed into a stack by a novel firing method using the silver paste. To construct a gauge having a sensitivity of $500\mu\mu$ coul/p.s.i. I use barium titanate crystals 0.425 inch in diameter and 0.060 inch thick, or 60 mils thick, and polarize a stack of five of such crystals at 3600 volts, or 60 volts/mil, for a period of three hours.

The first step in forming the stack is to paint the faces of the crystals that will lie in abutting relationship with silver paste; the crystals are then assembled in a jig and ends of the silver foil leads 14 are inserted between the crystal face edges and looped over the edges substantially as shown so that the lead ends lie sandwiched between coatings of silver paste. The assembly is then fired in an oven at 300° F. for about one hour for preliminary consolidation. After the assembly has cooled any excess silver is removed and the unit is then fired in the oven at 1400° F. for at least four hours for final consolidation.

Positive lead 10 is soldered to the top surface of the crystal and the sub assembly of the stack is now completed.

When the finished crystal stack is to be fitted into the housing the face of thimble 9 is painted with a potting compound, as is the top of the stack. The thimble is then allowed to slide down over the positive lead 10 and is pressed against the stack. A layer of potting compound shown generally as reference character 23 lies between the surfaces. The potting compound is used to fill the hole in the thimble through which lead 10 passes.

The housing is then dropped down over the thimble and stack thus positioning the stack in the housing. The housing is inverted and potting compound is poured therein until all interstices are filled. The brass diaphragm 4 is inserted over the open end of the crystal cavity to complete this portion of the assembly. Preferably a silver foil lead (not shown) is soldered between the end of the stack and the housing to insure proper negative electrical contact therebetween.

If the housing be now reinverted potting compound may be poured into the longitudinal bore 2 to fill the same and a fiber washer 6 is inserted at the top thereof. The potting compound is used to insulate the sensitive element in the stack compartment of the gauge and the positive lead 10 in the bore 2 when the high polarizing voltage is applied to sensitize the gauge after assembly or upon its becoming less sensitive after use or the like.

The positive terminal of the crystal assembly as previously pointed out is the top surface and lead 10 is run through tube 11 to an external cap mounted terminal consisting of a bushing 24 press fitted to tube 11 and having a threaded neck portion 19. The lead is brought out of an axial bore in the bushing, as shown, and a washer 20 is placed in contact therewith. When cap 17 is screwed down the lead and washer are brought firmly into contact and external line 21 may be soldered or otherwise secured to a lug 22 formed in the washer.

The gauge assembly is returned to the oven for one hour and maintained therein at 140° F. to set up the potting compound.

I have found that the gauge is best polarized by connecting it to a high voltage D.C. power supply and charging it with 3600 volts for three hours.

While I have herein disclosed a form of the invention preferred by me, various changes and modifications will occur to those skilled in the art after a study of the present disclosure. The disclosure, then, is to be taken in an illustrative rather than a limiting sense, and it is

I claim:

1. The method of making a repolarizable blast velocity gauge comprising a plurality of barium titanate crystals of uneven number, comprising the steps of coating the abutting faces of each successive crystal with a silver paste prior to placing it in stacked relation, inserting a first plurality of separate silver foil leads between even numbered interfaces and the end face of the first crystal to connect them in parallel on one side of said stack and alternately inserting a second plurality of separate silver foil leads between odd numbered interfaces and the end face of the final crystal to connect them in parallel on the other side of the stack as said stack is built up, firing the stack at about 300° F. for one hour for preliminary consolidation, cleaning excess silver from the periphery of the stack, firing the stack gradually up to 1400° F. for final consolidation and allowing it to cool gradually, soldering a positive lead to the center of the top crystal, polarizing said stack, placing an insulated thimble on top of said stack surrounding said positive lead and spaced from said stack and said lead by a layer of potting compound, placing said stack and thimble within a gauge housing having a stack compartment, and filling the interstices between said stack compartment and said stack with said potting compound, heating said gauge at about 140° F. for one hour to set the potting compound and polarizing said stack in said gauge.

2. The method of making a repolarizable blast velocity gauge comprising a plurality of five barium titanate crystals in parallel comprising the steps of painting one face of a first barium titanate crystal with a silver paste and placing this crystal in an aligning jig with the painted face up, painting both faces of a second said crystal with said paste and placing this crystal on top of the first crystal in the jig at the same time inserting one end of a first silver foil lead between the crystals, painting both faces of a third said crystal with said paste and placing this crystal on top of the second crystal in the jig at the same time inserting a second and third silver foil lead between said third and second crystal in side by side relation on the opposite side of the stack from said first lead, painting both faces of a fourth said crystal with said paste and placing this crystal on top of the third crystal in the jig and at the same time insert the free end of said first lead and a fourth silver foil lead side by side between the fourth and third crystal, painting one face of a fifth said crystal with said paste and placing this crystal on top of the fourth crystal in the jig with the painted face down at the same time inserting the free end of one of the second and third silver foil leads between the fifth and fourth crystals, aligning the crystals in said stack, firing said stack in the jig at 300° F. for one hour for preliminary consolidation, cleaning the stack of excess silver, gradually firing said stack up to 1400° F. over a period of four hours and allowing said stack to cool gradually to room temperature for final consolidation, soldering a copper wire lead to the center of the top crystal of the stack and polarizing said stack, placing an insulated thimble on top of said stack surrounding said positive lead and spaced from said stack and said lead by a layer of potting compound, placing said stack and thimble within a gauge housing having a stack compartment, filling the interstices between said compartment and said stack with said potting compound, heating the gauge for one hour at 140° F. to set said compound, painting the end of said compartment and the exposed end of said stack with said potting compound and one face of a brass foil closure for said compartment, joining said closure and said compartment, reheating the gauge for one hour at 140° F. to set the last mentioned potting compound, and polarizing said stack in said gauge.

References Cited in the file of this patent

UNITED STATES PATENTS

| | | |
|---|---|---|
| 2,242,755 | Pope | May 20, 1941 |
| 2,392,429 | Sykes | Jan. 8, 1946 |
| 2,408,816 | Shapiro | Oct. 8, 1946 |
| 2,477,246 | Gillespie | July 26, 1949 |
| 2,486,560 | Gray | Nov. 1, 1949 |
| 2,511,624 | D'Halloy | June 13, 1950 |
| 2,602,327 | Bond | July 8, 1952 |
| 2,618,698 | Janssen | Nov. 18, 1952 |
| 2,636,134 | Arons et al. | Apr. 21, 1953 |
| 2,708,244 | Jaffe | May 10, 1955 |